United States Patent

Meyer

(10) Patent No.: US 12,547,376 B2
(45) Date of Patent: Feb. 10, 2026

(54) INTEGRATED CIRCUIT FOR MODULAR MULTIPLICATION OF TWO INTEGERS FOR A CRYPTOGRAPHIC METHOD, AND METHOD FOR THE CRYPTOGRAPHIC PROCESSING OF DATA BASED ON MODULAR MULTIPLICATION

(71) Applicant: Infineon Technologies AG, Neubiberg (DE)

(72) Inventor: Bernd Meyer, Munich (DE)

(73) Assignee: Infineon Technologies AG, Neubiberg (DE)

( * ) Notice: Subject to any disclaimer, the term of this patent is extended or adjusted under 35 U.S.C. 154(b) by 1249 days.

(21) Appl. No.: 17/161,716

(22) Filed: Jan. 29, 2021

(65) Prior Publication Data

US 2021/0243006 A1 Aug. 5, 2021

(30) Foreign Application Priority Data

Jan. 31, 2020 (DE) ...................... 10 2020 102 453.3

(51) Int. Cl.
*G06F 7/72* (2006.01)
*G06F 7/544* (2006.01)

(52) U.S. Cl.
CPC ............ *G06F 7/728* (2013.01); *G06F 7/5443* (2013.01); *G06F 7/722* (2013.01)

(58) Field of Classification Search
CPC .......................... G06F 7/72–729; G06F 7/5443
See application file for complete search history.

(56) References Cited

U.S. PATENT DOCUMENTS

| 6,088,453 A | * | 7/2000 | Shimbo | .................... G06F 7/721 |
| | | | | 713/100 |
| 7,509,486 B1 | * | 3/2009 | Chin | ....................... G06F 21/72 |
| | | | | 708/492 |

(Continued)

FOREIGN PATENT DOCUMENTS

| DE | 10223853 A1 | 1/2004 |
| DE | 69828150 T2 | 12/2005 |
| DE | 102012210354 B3 | 11/2013 |

OTHER PUBLICATIONS

Liu, Zhe, and Johann Großschädl. "New Speed Records for Montgomery Modular Multiplication on 8-Bit AVR Microcontrollers." Cryptology ePrint Archive, 2014, eprint.iacr.org/2013/882. (Year: 2014).*

(Continued)

*Primary Examiner* — Jyoti Mehta
*Assistant Examiner* — Huy Duong
(74) *Attorney, Agent, or Firm* — Viering, Jentschura & Partner mbB

(57) ABSTRACT

Integrated circuits for modular multiplication of two integers for a cryptographic method, and methods for the cryptographic processing of data based on modular multiplication are herein disclosed. For example, an integrated circuit for modular multiplication of two integers for a cryptographic method has a processor that represents the integers to be multiplied in Montgomery representation with a specified Montgomery representation parameter and a specified modulus, and calculates the result of the modular multiplication of the integers to be multiplied in Montgomery representation iteratively from the least significant word to the most significant word, where for a word calculated in an iteration, the product of the word with a specified factor is added to the words of subsequent iterations, the specified factor given by the product of the negative inverse of the (Continued)

least significant word of the modulus and the modulus, without the least significant word of the product, plus one.

14 Claims, 7 Drawing Sheets

(56) References Cited

U.S. PATENT DOCUMENTS

| | | | |
|---|---|---|---|
| 2001/0010077 A1 | 7/2001 | Mcgregor et al. | |
| 2002/0059353 A1* | 5/2002 | Koc | G06F 7/72 708/491 |
| 2003/0140077 A1* | 7/2003 | Zaboronski | G06F 7/722 708/491 |
| 2005/0165876 A1* | 7/2005 | Mukaida | G06F 7/5443 708/523 |
| 2005/0223052 A1 | 10/2005 | Schimmler et al. | |
| 2006/0059219 A1* | 3/2006 | Koshy | G06F 7/728 708/491 |
| 2011/0013768 A1* | 1/2011 | Lambert | H04L 9/30 380/28 |
| 2019/0158284 A1* | 5/2019 | F. Aranha | G06F 17/16 |
| 2023/0185537 A1* | 6/2023 | Zhang | G06F 7/728 708/491 |

OTHER PUBLICATIONS

Hennessy, John L. et al. Computer Architecture : A Quantitative Approach, Elsevier Science & Technology, 2014. ProQuest Ebook Central, https://ebookcentral.proquest.com/lib/USPTO-ebooks/detail.action?docID=404052 (Year: 2014).*

Goldberg, Bar-Giora. Digital Frequency Synthesis Demystified, Elsevier Science & Technology, 1999. ProQuest Ebook Central, https://ebookcentral.proquest.com/lib/USPTO-ebooks/detail.action?docID=318413 (Year: 1999).*

Maxfield Clive. The Design Warrior's Guide to FPGAs: Devices, Tools, Flows, Elsevier Science & Technology, 2004. ProQuest Ebook Central, https://ebookcentral.proquest.com/lib/USPTO-ebooks/detail.action?docID=226686 (Year: 2004).*

Walls, Colin. Embedded Software : The Works, Elsevier Science & Technology, 2005. ProQuest Ebook Central, https://ebookcentral.proquest.com/lib/USPTO-ebooks/detail.action?docID=269765. (Year: 2005).*

Walther, Christoph, "Formally Verified Montgomery Multiplication," 2018, pp. 505-522.

German Office Action issued for DE Patent Application No. 10 2020 102 453.3, dated Oct. 1, 2020, 9 Pages (for Informational purpose only).

* cited by examiner

INTEGRATED CIRCUIT FOR MODULAR MULTIPLICATION OF TWO INTEGERS FOR A CRYPTOGRAPHIC METHOD, AND METHOD FOR THE CRYPTOGRAPHIC PROCESSING OF DATA BASED ON MODULAR MULTIPLICATION

CROSS-REFERENCE TO RELATED APPLICATION

This patent application claims the benefit of priority to German Patent Application Serial No. 10 2020 102 453.3, which was filed on Jan. 31, 2020, and is incorporated herein by reference in its entirety and for all purposes.

TECHNICAL FIELD

This disclosure generally relates to integrated circuits for the modular multiplication of two integers for a cryptographic method, and methods for the cryptographic processing of data based on modular multiplication.

BACKGROUND

In the context of security-relevant applications, computer chips, such as those on a chip card or in a control device in a vehicle, typically perform cryptographic procedures for encryption, decryption and authentication, etc. Some of these cryptographic procedures use modular arithmetics with long integers (long numbers) over finite rings and fields. In binary representation, the bit lengths of the long numbers used are in the region of several hundred to several thousand bits. If two long numbers are multiplied or if a long number is squared, the result must be reduced modulo the modulus used. An efficient method for implementing modular multiplication or modular squaring is the so-called Montgomery multiplication.

In an implementation of the Montgomery method for long number multiplication on a processor, which requires u words in the bus width b of the processor for the representation, conventional algorithms for implementing the Montgomery reduction step require $u^2+u$ multiplications in the bus width b of the processor, where u is the length of the numbers to be multiplied in words (of word length b). In implementations using pipelines, pipeline stalls can also occur, which further increase the execution time.

Therefore, there is a demand for approaches to the cryptographic processing of data based on modular multiplication, which are more suitable for hardware that supports pipelining.

SUMMARY

According to a non-limiting embodiment, an integrated circuit for modular multiplication of two integers for a cryptographic method is provided, which has a processor configured to represent the integers to be multiplied in Montgomery representation with a specified Montgomery representation parameter and a specified modulus, and to calculate the result of the modular multiplication of the integers to be multiplied in Montgomery representation iteratively from the least significant word to the most significant word, wherein for a word calculated in an iteration, the product of the word with a specified factor is added to the words of subsequent iterations, the specified factor being given by the product of the negative inverse of the least significant word of the modulus and the modulus, without the least significant word of the product, plus one.

According to another non-limiting embodiment, a method for the cryptographic processing of data is provided, based on modular multiplication corresponding to the integrated circuit described above.

BRIEF DESCRIPTION OF THE DRAWINGS

The figures do not reflect the actual proportions, but are intended to illustrate the principles of the various non-limiting embodiments. In the following text, various non-limiting embodiments are described with reference to the following figures.

DESCRIPTION

The following detailed description refers to the enclosed figures, which show details and non-limiting embodiments. These non-limiting embodiments are described in sufficient detail to enable the person skilled in the art to embody this disclosure. Other non-limiting embodiments are also possible, and the non-limiting embodiments can be modified in terms of their structural, logical and electrical aspects without deviating from the subject matter of this disclosure. The different non-limiting embodiments are not necessarily mutually exclusive, but different non-limiting embodiments can be combined to create new non-limiting embodiments. For the purposes of this description, the terms "connected" and "coupled" are used to describe both a direct and indirect connection, and a direct or indirect coupling.

Figure 1:
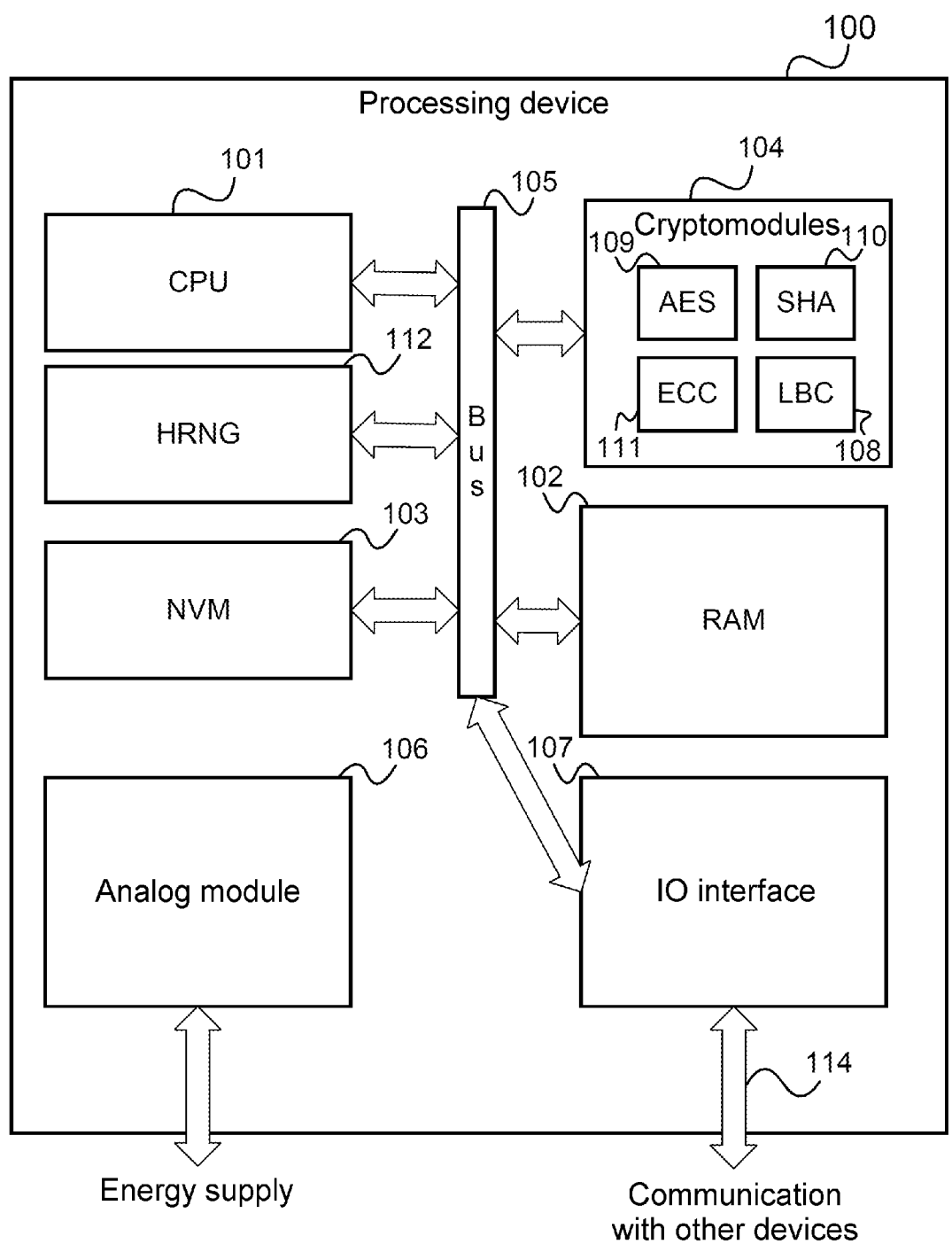
FIG. 1 shows an example of a processing device for the cryptographic processing of data.

FIG. 1 shows an example of a processing device 100 having a CPU 101, a random access memory (RAM) 102, a non-volatile memory 103 (NVM), a cryptomodule 104, an analog module 106, an input/output interface 107 and a hardware random number generator 112.

In this example, the CPU 101 has access to at least one cryptomodule 104 via a shared bus 105, to which each cryptomodule 104 is connected. In particular, each cryptomodule 104 can comprise one or more cryptocores in order to perform certain cryptographic operations. Examples of cryptocores are:

- an AES core 109,
- an SHA core 110,
- an ECC core 111, and
- a lattice-based cryptocore (LBC) 108.

The lattice-based cryptocore 108 can be provided to accelerate lattice-based cryptography.

The CPU 101, the hardware random number generator 112, the NVM 103, the cryptomodule 104, the RAM 102 and the input/output interface 107 are connected to the bus 105.

The input/output interface 107 can have a connection 114 to other devices similar to the processing device 100.

The analog module 106 is supplied with electrical energy via an electrical contact and/or via an electromagnetic field. This energy is supplied to power the circuit of the processing device 100 and may, in particular, enable the input/output interface 107 to initiate and/or maintain connections to other devices via the connection 114.

The bus 105 itself can be masked or simple. Instructions for executing the processing and the algorithms described below can be stored in particular in the NVM 103 and processed by the CPU 101. The processed data can be stored in the NVM 103 or in the RAM 102. Random numbers are supplied by the hardware random number generator 112.

The processing and algorithms described below can be performed exclusively or at least partially on the cryptomodule 104. However, they can also be carried out by the CPU 101 and a dedicated cryptomodule 104 can then be omitted.

The components of the processing device 100 can be implemented on a single chip or on multiple chips. The processing device 100 may be a chip card (or a chip card module) that is supplied by direct electrical contact or by an electromagnetic field. The processing device 100 can be a fixed circuit or be based on reconfigurable hardware (e.g. a Field Programmable Gate Array, FPGA). The processing device 100 can be connected to a personal computer, microcontroller, FPGA or a smartphone system on a chip (SoC), or other components of a smartphone. The processing device 100 can be a chip that functions as a Trusted Platform Module (TPM) and provides cryptographic functionality conforming to a standardized interface to a computer, smartphone, Internet of Things (IoT) device, or vehicle. However, the processing device 100 itself can also be a stand-alone data processing device, e.g. a personal computer, a smartphone etc.

Implementations of asymmetric cryptographic methods (such as RSA, Diffie-Hellman, DSA, or related methods based on elliptic curves) use modular arithmetics with long integers (long numbers) over finite rings and fields. In binary representation, the bit lengths of the long numbers used are in the region of several hundred to several thousand bits. If two long numbers are multiplied or if a long number is squared, the result must be reduced modulo the modulus used. To this end, the calculation result is divided by the modulus and the remainder of the division is determined. This calculation step is generally algorithmically complex. An efficient method for implementing a modular multiplication or modular squaring (i.e. multiplication and squaring followed by modular reduction) is so-called Montgomery multiplication.

In the following, let a, b, R and n be long numbers and let R and n be coprime (that is, gcd(R, n)=1) and R>n. The number R is referred to hereafter as the Montgomery representation parameter, and the number n is the modulus. The Montgomery method for modular multiplication a*b mod n replaces the step of division by n to determine the remainder with a division by the long number R. R is selected such that division by R can be implemented very simply. In cryptographically relevant applications n is typically odd and $\beta=2'$ is a power of 2. The division by R then corresponds to a shift to the right by R bit positions. Here w refers to the bit length of the Montgomery representation parameter, which has at least the same length as the long numbers to be multiplied. For this reduction method to work, the Montgomery multiplication maps the operands a and b into the Montgomery representation $\alpha=a*R$ mod n and $\beta=b*R$ mod n, i.e. it represents a and b in Montgomery representation. The Montgomery multiplication then calculates the value $\gamma=a*P/R$ mod n, which corresponds to the Montgomery representation $\gamma=a*b*R$ mod n of the modular product a*b mod n. During the Montgomery multiplication, a modular division by R must, therefore, be performed.

When implementing an asymmetric cryptographic method, all operands are initially converted to the Montgomery representation, all intermediate steps are performed in the Montgomery representation using Montgomery multiplication and reduction, and finally the result is transformed back into the normal numerical representation.

The correctness of the Montgomery multiplication and reduction method is based on the following two mathematical properties:

1. For two coprime numbers s and t there exists a modular inverse $0 < s^{-1} < t$ with the property $s*s^{-1} = 1$ mod t.
2. Let s and t be coprime and let u and v be additional numbers. It then follows from the Chinese remainder theorem that a number $0 \leq z < s*t$ exists with $z=u$ mod s and $z=v$ mod t.

From the first property it follows directly that the mapping of an operand a into the Montgomery representation $\alpha = a*R$ mod n is bijective and thus reversible. From the second property it follows that for a product $\alpha*\beta$ there is a number $0 \leq z < n*R$ with $z = \alpha*\beta$ mod n and $z = 0$ mod R. Then z is divisible by R and $\gamma = z/R$.

During the Montgomery reduction, therefore, for a product $\alpha*\beta$ obtained as an intermediate result, a correction value of $0 \leq E < n*R$ is determined with $E = 0$ mod n and $\alpha*\beta + E = 0$ mod R. The number $\alpha*\beta + E$ has the same value as $\alpha*\beta$ modulo n, but is divisible by R and $\gamma = (\alpha*\beta + E)/R$ is used as the result of the Montgomery multiplication, where the division by R can again be easily implemented by assumption (for example, by a shift operation). It can be shown that for the result thus obtained the following applies: $0 \leq \gamma < 2n$. In some implementations, the modulus n is finally subtracted again if $\gamma \geq n$ is true. However, this conditional subtraction often allows side-channel attacks on the secret key material that is used and is usually avoided (for example, by increasing the number R).

The algorithmic complexity required to calculate the correction value E corresponds approximately to an additional long-number multiplication. As a result, the Montgomery reduction can often be implemented more efficiently than a modular reduction using a division algorithm.

In the following, to simplify the presentation the special case relevant to cryptographic applications is considered, namely that R is a power of 2 and the modulus n is odd. (If n and R are not coprime, the greatest common divisor of n and R can be factored out first, and the full result can be finally determined using the Chinese remainder theorem.)

The way in which the correction value E is determined, which enables the efficient division of $\alpha*\beta + E$ by R, depends heavily on whether a hardware implementation (with fixed dedicated hardware) or an implementation on a programmable processor (i.e. a "software" implementation) of the Montgomery multiplication is used. For example, in a simple hardware implementation of the reduction method, it is sufficient to consider the least significant bit, referred to as LSB, of the product $\alpha*\beta$ obtained as an intermediate result.

Algorithm 1: (Hardware Implementation)

Input: Let $\alpha = a*R$ mod n and $\beta = b*R$ mod n be operands of length w bits in Montgomery representation, where n is the modulus, n is odd and $\beta = 2^w$.

```
1. Calculate product z ← α*β
2. for i ← 1 to w do
3.     if LSB(z) = 1 then
4.         z ← z + n   /* after this, LSB(z) = 0 because n odd */
5.     fi
6.     z ← SHR(z, 1)   /* shift one bit position to the right: z ← z/2 */
7. od
8. return z
```

SHR here refers to the shift by one bit position to the right (shift right).

In the case of an implementation on a processor (e.g. CPU 101 or cryptomodule 104) with a specific register width or bus width, the long numbers are usually represented as vectors $d=(d_{u-1}, \ldots, d_0)$ of u data words $d_j$ in the bus width b bits of the processor, with $0 \leq j \leq u$. Such a vector d then represents the number:

$$\sum_{j=0}^{u-1} d_j 2^{b*j}$$

The processor then processes the long numbers during the multiplication and reduction in words of width b bits to achieve a high bandwidth and performance. For example, in a simple implementation of the reduction method on a processor, it is sufficient to consider the least significant word, referred to as LSW(.), of the product $\alpha*\beta$ obtained as an intermediate result:

Algorithm 2: (Implementation on a Processor with Operand Scanning)

Input: Let $\alpha = a*R \mod n$ and $\beta = b*R \mod n$ be operands of length w bits in Montgomery representation, where n is the modulus, n is odd and $\beta = 2^w$ with $w = b*u$. Let b be the bus width of the processor used and let $n = (n_{u-1}, \ldots, n_0)$ be the representation of the modulus n as a sequence of words of length b bits and let $\eta = -n_0^{-1} \mod 2^b$ be the negated modular inverse of LSW(n).

```
1. Calculate product z ← α*β with z = (z_{2u-1}, ..., z_0)
2. for i ← 1 to u do
3.     h ← LSW(z)*η mod 2^b  /* only the lower b bits
                                  of the product are needed */
4.     h ← h*n
5.     z ← z + h          /* after this, LSW(z) = 0 */
6.     z ← SHR(z, b)/* shift b bit positions to the right: z ← z/2^b */
7. od
8. return z
```

Many variants of the described algorithm are possible. In particular, the reduction steps (steps 3 to 6) can be suitably interleaved with the multiplications in step 1. This reduces the amount of storage required by the algorithms for intermediate results.

In each passage iteration of the loop, algorithm 2 performs one multiplication of words of width b (in step 3) and u multiplications of words of width b (in step 4) This means that $u^2+u$ multiplications in the bus width b of the processor are required to implement the Montgomery reduction step. The value $\eta$ depends only on the modulus n and therefore can be pre-calculated and stored as a system parameter.

The procedure in algorithm 2 is also known as operand scanning, because the partial products are calculated row by row in steps 4 and 5.

Figure 2:
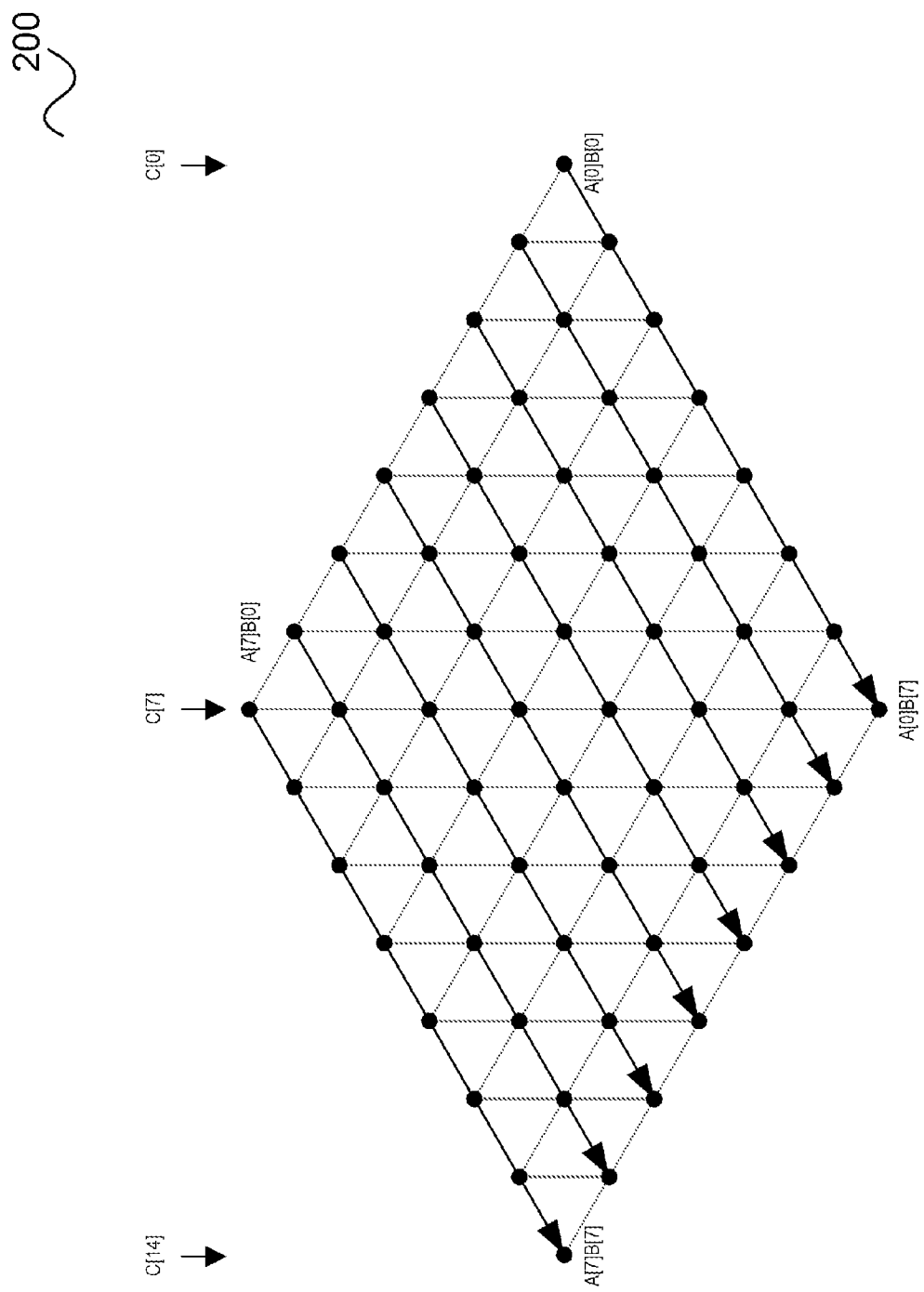
FIG. 2 shows a diagram illustrating operand scanning for the multiplication of two operands.

FIG. 2 shows a diagram 200, which illustrates operand scanning for the multiplication of two operands, each consisting of eight words.

Each point in diagram 200 represents a multiplication of words of the two operands. Arrows indicate the sequence in which the partial products are calculated one after the other.

According to operand scanning, a word A[i] of an operand is loaded (e.g. into a register of a processor) and A[i] is multiplied by all words B[j] of the second operand (which are loaded consecutively, e.g. into another register) in sequence (i.e. one partial product is formed in each case), before proceeding with the next word A[i+1]. C[ ] denotes the result.

To accelerate the multiplication, a multiplier-accumulator unit (MAC) can be implemented in hardware.

Figure 3:
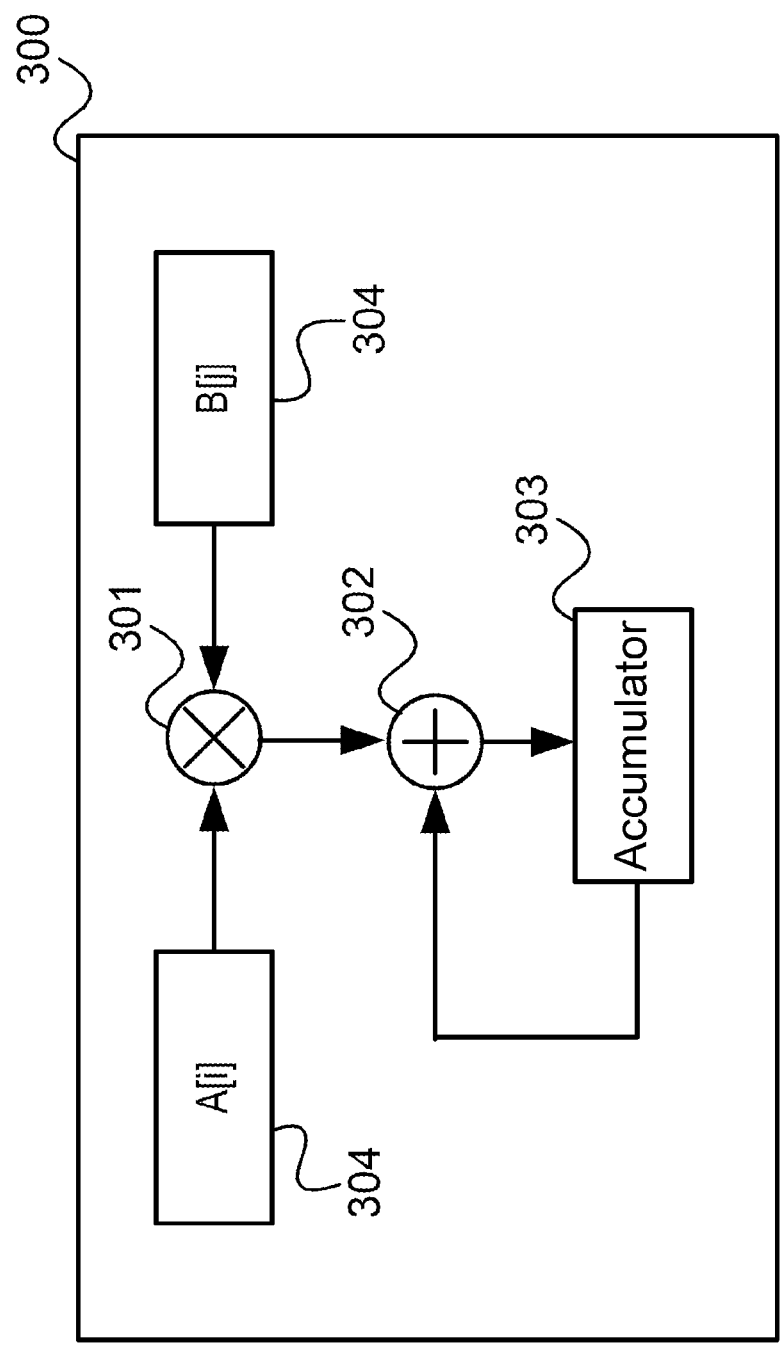
FIG. 3 shows a multiplier-accumulator (MAC) unit.

FIG. 3 shows a MAC unit 300.

The MAC unit 300 comprises a multiplier 301, which calculates the product of length 2w bits for two words of length w bits stored in registers 304, an adder 302 of length 2w+c bits, where c is a small constant (typically 8 bits), and a register 303 (accumulator, hereafter referred to as accu) of length 2w+c bits. The MAC unit 300 can calculate the product A[i]*B[j] of two words A[i] and B[j] and then add the product A[i]*B[j] to the current contents of the accumulator in a single calculation step. Because the accumulator and adder are c bits longer than the product to be added, any carry operations that might arise during the addition can be absorbed. Using a MAC unit 300, it is possible to calculate scalar products of vectors A and B consisting of words of length w bits very efficiently.

If the hardware used to implement the Montgomery reduction provides a MAC unit, this can be exploited by implementing an algorithm with product scanning.

Figure 4:
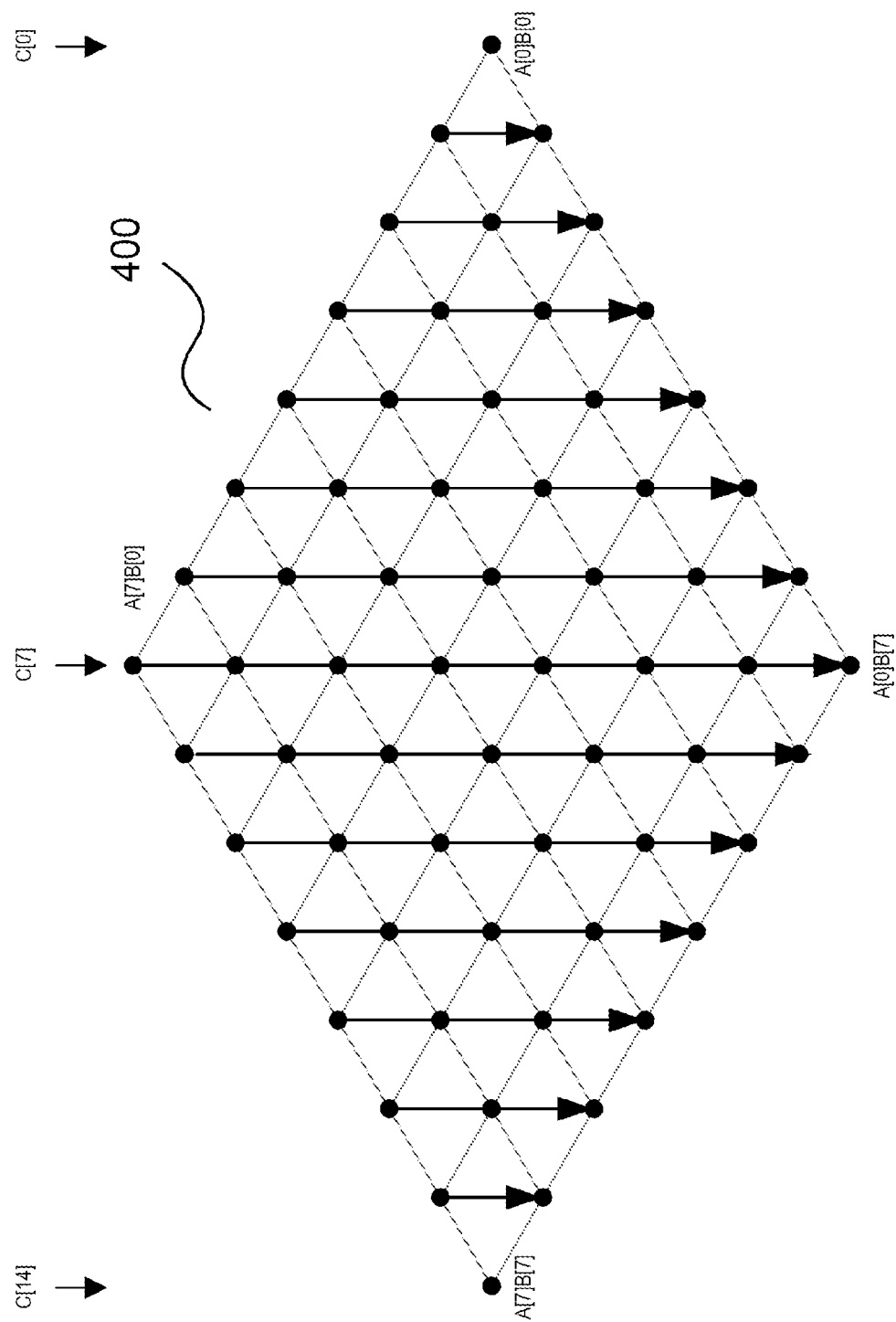
FIG. 4 shows a diagram illustrating product scanning for the multiplication of two operands.

FIG. 4 shows a diagram 400, which illustrates product scanning for the multiplication of two operands, each consisting of eight words.

As in FIG. 2, each point in the diagram 400 represents a multiplication of words of the two operands. Arrows indicate the sequence in which the partial products are calculated one after the other.

In the product scanning, the partial products are calculated column by column. This means that all A[i] are multiplied by all B[j], so that the sum s=i+j is constant in any column. After summing all partial products (for the constant s, e.g. in the accumulator 303), the resulting C[s] is stored in the memory (e.g. RAM 102). The next column s+1 is then processed.

The following algorithm 3 is based on product scanning.
Algorithm 3: (Implementation on a Processor with Product Scanning)

Input: Let $\alpha = a*R \mod n$ and $\beta = b*R \mod n$ be operands of length w bits in Montgomery representation, where n is the modulus, n is odd and $\beta = 2^w$ with $w = b*u$. Let b be the bus width of the processor used and let $\alpha = (\alpha_{u-1}, \ldots, \alpha_0)$, $\beta = (\beta_{u-1}, \ldots, \beta_0)$ and $n = (n_{u-1}, \ldots, n_0)$ be the representations of the long numbers $\alpha$, $\beta$ and of the modulus n as a sequence of words of length b bits, and let $\eta = -n_0^{-1} \mod 2^b$ be the negated modular inverse of LSW(n).

```
1. accu ← 0
2. for i ← 0 to u-1 do
3.     for k ← 0 to i-1 do
```

-continued

```
4.          accu ← accu + α_k*β_{i-k} + e_k*n_{i-k}    /* calculate products
                                                          α*β and n*E for column i */
5.       od
6.       accu ← accu + α_i*β_0         /* add last summand of the i-th word
                                           of α*β */
7.       e_i ← LSW(accu)*η mod 2^b    /* calculate the i-th word of the
                                           correction value E */
8.       accu ← accu + e_i*n_0         /* after this, LSW(accu) = 0 applies */
9.       accu ← SHR(accu, b)           /* shift b bit positions to the right:
                                           accu ← accu/2^b */
10. od
11. for i ← 1 to u-1 do
12.      for k ← i to u-1 do
13.         accu ← accu + α_k*β_{u-1+i-k} + e_k*n_{u-1+i-k}  /* products α*β and n*E for
                                                                column u-1+i */
14.      od
15.      Z_{i-1} ← LSW(accu)           /* calculate word i-1 of the result */
16.      accu ← SHR(accu, b)           /* shift b bit positions to the right:
                                           accu ← accu/2b */
17. od
18. z_{u-1} ← LSW(accu)               /* save carried values */
19. accu ← SHR(accu, b)
20. z_u ← LSW(accu)
21. return z
```

It can be seen how multiplication and reduction steps are interleaved with each other in steps 1 to 10. However, the multiplication by η in step 7 interferes with the uniform processing of the calculation of the two scalar products $α_k*β_{i-k}$ and $e_k*n_{i-k}$ in step 4. For example, if MAC units 300 are provided with pipeline stages for calculating the two scalar products (the results of which are accumulated in a common accumulator, for example), the pipeline must first be emptied at this point, the multiplication by 11 calculated, and then the pipeline filled again for the subsequent calculation of the scalar products. This results in pipeline-stalls, which can significantly degrade the performance of the algorithm.

A pipeline is a type of "assembly line" that breaks down the execution of commands into subtasks that are performed in parallel for multiple commands. In this manner, the execution of a complex task can be broken down into simpler parts that can be efficiently calculated, so that although the result of the entire operation is only available after a delay due to the "assembly line", the overall throughput of the "assembly line" is not reduced by the parallelism of the pipeline stages.

Figure 5:
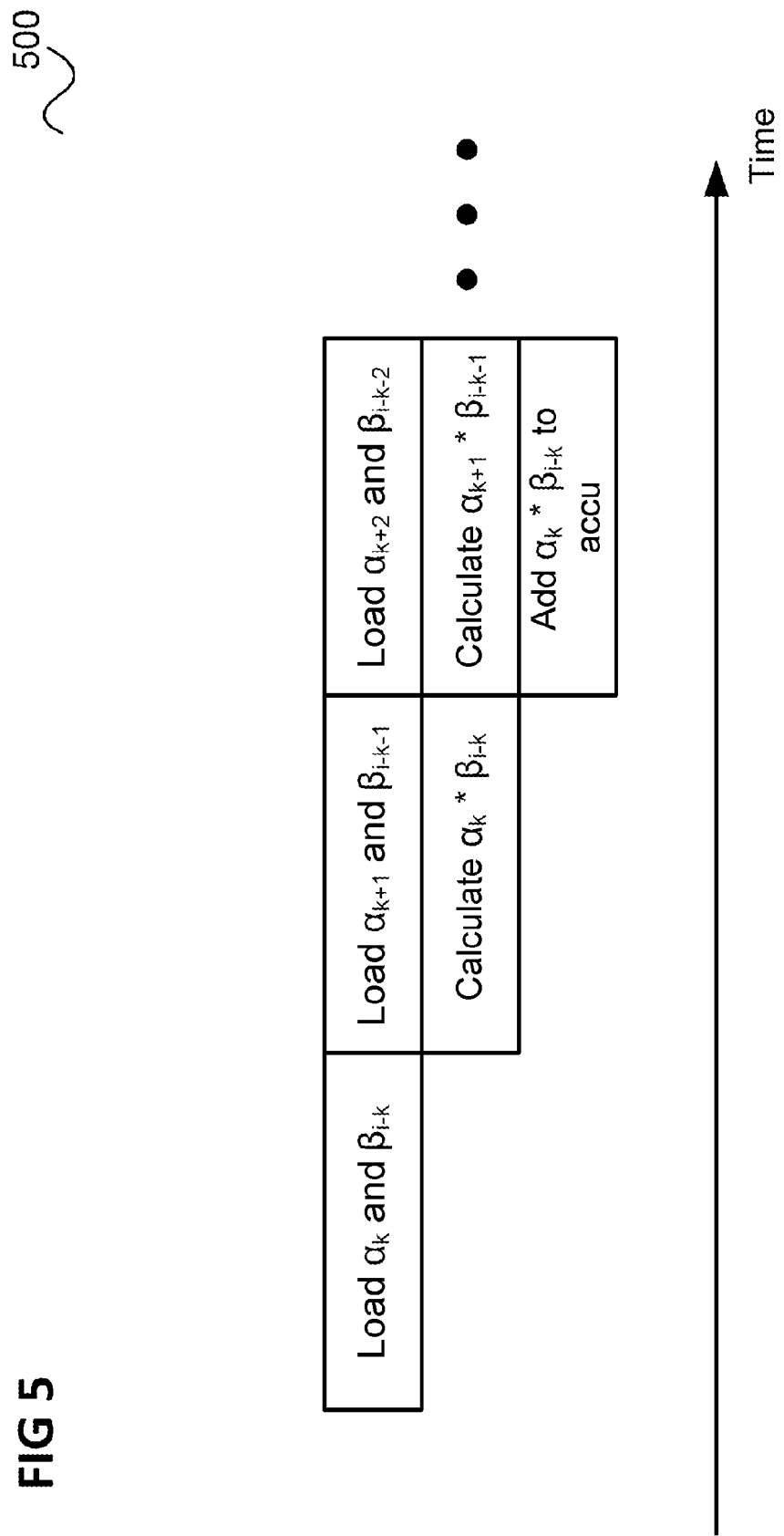
FIG. 5 illustrates a simple pipelining procedure for calculating a scalar product.

FIG. 5 illustrates a simple pipelining procedure for calculating the scalar product of $α_k$ and $β_{i-k}$ (for k=0, ..., i−1).

Each block in FIG. 5 symbolizes a subtask. As illustrated, the addition to the accumulator (e.g. by the adder 302) for one index can be performed in parallel with the calculation of the product for the next index (e.g. by the multiplier 301) and loading (e.g. in register 304) for the next index but one. However, if this process is interrupted, the pipeline must be completely emptied (i.e. all subtasks must be completed) and can only be refilled afterwards. This is the case in step 7 of algorithm 3, because it interrupts the calculation of the terms for the scalar product in step 4.

In addition, algorithm 3 requires a total of $u^2$ multiplications in the bus width b of the processor for the product α*β and $u^2+u$ multiplications for the Montgomery reduction.

According to different non-limiting embodiments, an implementation variant of the Montgomery reduction is used, which only requires $u^2+1$ multiplications in the bus width b of the processor. In addition, the resulting process is much more uniform, which is particularly advantageous when using multipliers with pipeline stages, since the pipeline-stalls described above can be avoided.

According to a non-limiting embodiment, the multiplication in step 3 of algorithm 2 is "factored out." Instead of multiplying the word LSW(z) by the pre-calculated constant η, the multiple η*n of the module is now pre-calculated and $ζ=(ζ_{u-1},...,ζ_0)=SHR(η*n, b)+1=(η*n+1)/2^b$ is stored as an additional system parameter (which in turn depends only on the modulus n). Because by design $LSW(η*n)=2^b-1=-1$ mod $2^b$ is always true, the least significant word of η*n does not need to be saved and there is no need to multiply by this word (in step 4).

It is noted that the multiplication step $h*n_0$ in step 4 in algorithm 2 also only contributes part of the time: the lower b bits of the product are always $-z_0$ mod $2^b$ and are then set to 0 in step 5 and removed by the division (or the shift operation) in step 6. The only reason to carry out the multiplication h*no is to determine the carry value in the upper b bits during the addition in step 5. This value cannot be easily predicted in the implementation variant of algorithm 2.

In addition, the relationship $z_0+z_0*LSW(η*n, b)=z_0*2^b$ is valid, which means that the value carried in the upper b bits of the addition with $z_0*LSW(η*n, b)$ is also known. Specifically, in step 5 of algorithm 2, $z_0=LSW(z)$ is always added as a carry value. Therefore, the definition of (contains an addition with 1.

In this manner, in the first u−1 iterations of the loop in algorithm 2, the multiplication by η in step 3 can be omitted. The resulting algorithm (see algorithm 4 and algorithm 5 below), therefore, requires only $u^2+1$ multiplications in the bus width b of the processor to implement the Montgomery reduction step. An additional advantage obtained is a much more uniform procedure, which is particularly advantageous when using multipliers with pipeline stages. In algorithm 2, for the multiplication by η in step 3, the pipeline of the multiplier must be emptied and refilled from scratch after the multiplication LSW(z)*η has been calculated, which results in a significant delay in each iteration of the loop due to the resulting pipeline-stalls. (See also algorithm 3)

In addition to the word η, a total of u words for the long number (are stored as a further system parameter. In the final reduction step, the method from algorithm 2 is applied to avoid extending the result by an entire word. In addition, in some cases the result of the reduction process may become up to 3n in size if the long numbers to be processed and the Montgomery representation parameter R are the same length. However, if the Montgomery representation parameter is a few bits longer than the long numbers to be multiplied (to ensure this, for example, the long number representation can be extended by at least one additional word), as with algorithm 2, it is the case that the size of the result of the Montgomery reduction can be no more than 2n.

The following algorithm 4 provides a complete description of a Montgomery reduction implementation according to a non-limiting embodiment (with operand scanning).

Algorithm 4: (Implementation on a Processor with Operand Scanning According to One Non-Limiting Embodiment)

Input: Let $\alpha=a*R \mod n$ and $\beta=b*R \mod n$ be operands of length w bits in Montgomery representation, where n is the modulus, n is odd and $\beta=2^w$ with $w=b*u$. Let b be the bus width of the processor used and let $n=(n_{u-1}, \ldots, n_0)$, $\eta=-n_0^{-1} \mod 2^b$ be the negated modular inverse of LSW(n) and $\zeta=SHR(\eta*n, b)+1$.

1. Calculate product $z \leftarrow \alpha*\beta$ with $z = (z_{2u-2}, \ldots, z_0)$
2. for $i \leftarrow 1$ to u-1 do
3.     $h \leftarrow LSW(z)$
4.     $z \leftarrow SHR(z, b)$     /* shift b bit positions to the right: $z \leftarrow (z - LSW(z))/2^b$ */
5.     $h \leftarrow h*\zeta$
6.     $z \leftarrow z + h$
7. od
8. $h \leftarrow LSW(z)*\eta \mod 2^b$     /* only the lower b bits of the product are required */
9. $h \leftarrow h*n$
10. $z \leftarrow z + h$     /* after this, LSW(z) = 0 */
11. $z \leftarrow SHR(z, b)$     /* shift b bit positions to the right: $z \leftarrow z/2^b$ */
12. return z Many variants of the described algorithm are possible. In particular, the reduction steps (steps 3 to 6) can be suitably interleaved with the multiplication in step 1. This can reduce the amount of storage required by the algorithm for intermediate results.

In the u−1 iterations of the loop, the value $\zeta$ is used for the reduction. Finally, a single reduction step (as in algorithm 2) is performed with $\eta$ and n. The values $\zeta$ and $\eta$ depend only on the modulus n and therefore can be pre-calculated and stored as system parameters.

For example, an implementation according to this disclosure of the method with product scanning reads as follows:

Algorithm 5: (Implementation on a Processor with Product Scanning According to One Non-Limiting Embodiment)

Input: Let $\alpha=a*R \mod n$ and $\beta=b*R \mod n$ be operands of length w bits in Montgomery representation, where n is the modulus, n is odd and $\beta=2^w$ with $w=b*u$. Let b be the bus width of the processor used, let $\alpha=(\alpha_{u-1}, \ldots, \alpha_0)$, $\beta=(\beta_{u-1}, \ldots, \beta_0)$ and $n=(n_{u-1}, \ldots, n_0)$ be the representations of the long numbers $\alpha$, $\beta$ and of the modulus n as a sequence of words of length b bits, let $\eta=-n_0^{-1} \mod 2^b$ be the negated modular inverse of LSW(n) and given $\zeta=SHR(\eta*n, b)+1$ with the representation $\zeta=_{u-1}, \ldots, \zeta_0)$ as a sequence of words of length b bits.

1. accu $\leftarrow$ 0
2. for $i \leftarrow 0$ to u-2 do
3.     for $k \leftarrow 0$ to i-1 do
4.         accu $\leftarrow$ accu + $\alpha_k*\beta_{i-k} + e_k*\zeta_{i-k-1}$     /* calculate products $\alpha*\beta$ and $\zeta*E$ for column i */
5.     od
6.     accu $\leftarrow$ accu + $\alpha_i*\beta_0$     /* add last summand of the i-th word of $\alpha*\beta$ */
7.     $e_i \leftarrow$ LSW(accu)     /* calculate the i-th word of the correction value E */
8.     accu $\leftarrow$ SHR(accu, b)     /* shift b bit positions to the right: accu $\leftarrow$ accu/$2^b$ */
9. od
10. for $k \leftarrow 0$ to u-1 do
11.     accu $\leftarrow$ accu + $\alpha_k*\beta_{u-1-k} + e_k*\zeta_{u-2-k}$     /* calculate products $\alpha*\beta$ and $\zeta*E$ for column u-1 */
12. od
13. accu $\leftarrow$ accu + $\alpha_{u-1}*\beta_0$     /* add the last sum of the (u-1)-th word of $\alpha*\beta$ */
14. $e_{u-1} \leftarrow$ LSW(accu)$*\eta \mod 2^b$     /* calculate the (u-1)-th word of the correction value E */
15. accu $\leftarrow$ accu + $e_{u-1}*n_0$     /* after this, LSW(accu) = 0 */
16. accu $\leftarrow$ SHR(accu, b)     /* shift b bit positions to the right: accu $\leftarrow$ accu/$2^b$ */
17. for $i \leftarrow 1$ to u-1 do
18.     accu $\leftarrow$ accu + $e_{i-1}*\zeta_{u-1}$
19.     for $k \leftarrow i$ to u-2 do
20.         accu $\leftarrow$ accu + $\alpha_k*\beta_{u-1+i-k} + e_k*\zeta_{u-2+i-k}$     /* Products $\alpha*\beta$ and $\zeta*E$ for column u-1+i */
21.     od
22.     accu $\leftarrow$ accu + $\alpha_{u-1}*\beta_i + e_{u-1}*n_i$     /* last summand for column u-1+i with $\alpha*\beta$ and $n*E$ */
23.     $z_{i-1} \leftarrow$ LSW(accu)     /* calculate word i-1 of the result */
24.     accu $\leftarrow$ SHR(accu, b)     /* shift b bit positions to the right: accu $\leftarrow$ accu/$2^b$ */
25. od
26. $z_{u-1} \leftarrow$ LSW(accu)     /* save carried values */
27. accu $\leftarrow$ SHR(accu, b)
28. $z_u \leftarrow$ LSW(accu)
29. return z In steps 1 to 12, the intermediate results during the first u−1 iterations of the main loop are reduced with ζ. In steps 13 to 16, reduction must be performed once with η and n. The values ζ and η depend only on the modulus n and therefore can be pre-calculated and stored as system parameters.

The uniform sequence of the calculation of the different scalar products is now only interrupted once in step 14. All other multiplications cannot cause pipeline stalls of the MAC unit.

Figure 6:
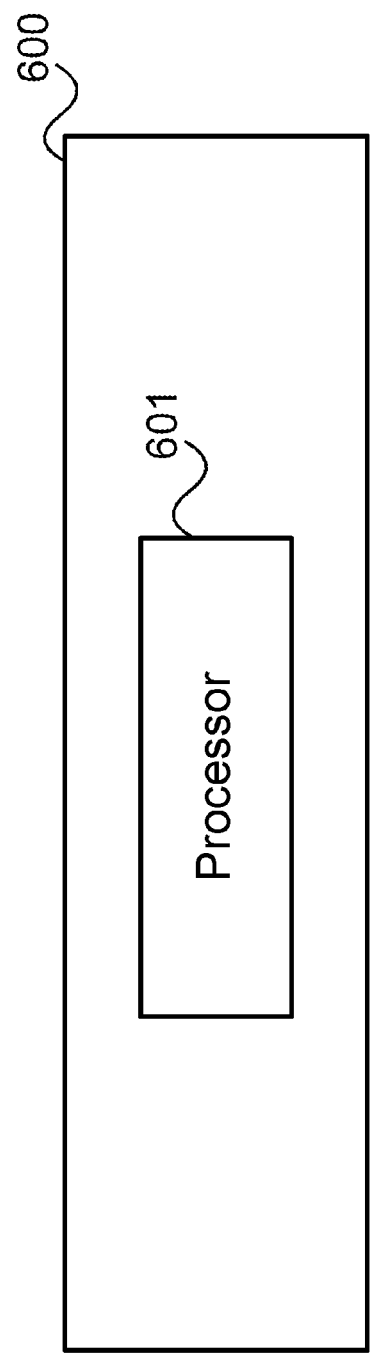
FIG. 6 shows an integrated circuit for the modular multiplication of two integers for a cryptographic method according to a non-limiting embodiment.

In summary, according to various non-limiting embodiments an integrated circuit as shown in FIG. 6 is provided.

FIG. 6 shows an integrated circuit 600 for the modular multiplication of two integers for a cryptographic method according to a non-limiting embodiment.

The integrated circuit 600 has a processor 601, which is configured to represent the integers to be multiplied in Montgomery representation with a specified Montgomery representation parameter and a specified modulus, and to calculate the result of the modular multiplication of the integers to be multiplied in Montgomery representation iteratively from the least significant word to the most significant word, wherein for a word calculated in an iteration, the product of the word and a specified factor is added to the words of subsequent iterations, the specified factor being given by the product of the negative inverse of the least significant word of the modulus and the modulus, without the least significant word of the product, plus one.

In other words, according to various non-limiting embodiments, a factor ((in the above examples) which is used to correct the result of the multiplication of the two numbers to be multiplied in Montgomery representation is treated as a constant (and, for example, pre-calculated), which the less significant words of the result are multiplied by to correct the result. The correction is made in such a way that the corrected result is divisible by the Montgomery representation parameter (accordingly, the number of less significant words used for correction is obtained). The correction corresponds to the addition of a correction value (formed from the less significant words), which is divisible by the modulus.

For example, in algorithm 2, η is first multiplied by $z_0$=LSW(z) and then (the lower b bits of the product $\eta*z_0$) are multiplied by the modulus n. In algorithm 4, η is first multiplied by n instead. The result then does not depend on the operands to be multiplied and defines a new system parameter $\zeta$=SHR($\eta*n$, b)+1. In this manner, the multiplication by η can be factored out of the first u−1 iterations of the loop and omitted. In algorithm 2, the multiplication step $h*n_0$ (at least for the lower b bits of the result) is redundant.

The approach of FIG. 6 allows a more homogeneous processing (in terms of pipelining) and also reduces the number of operations required. Thus, the approach takes account of the technical properties of the underlying hardware, such as pipelining or the use of one or more MAC units.

Figure 7:
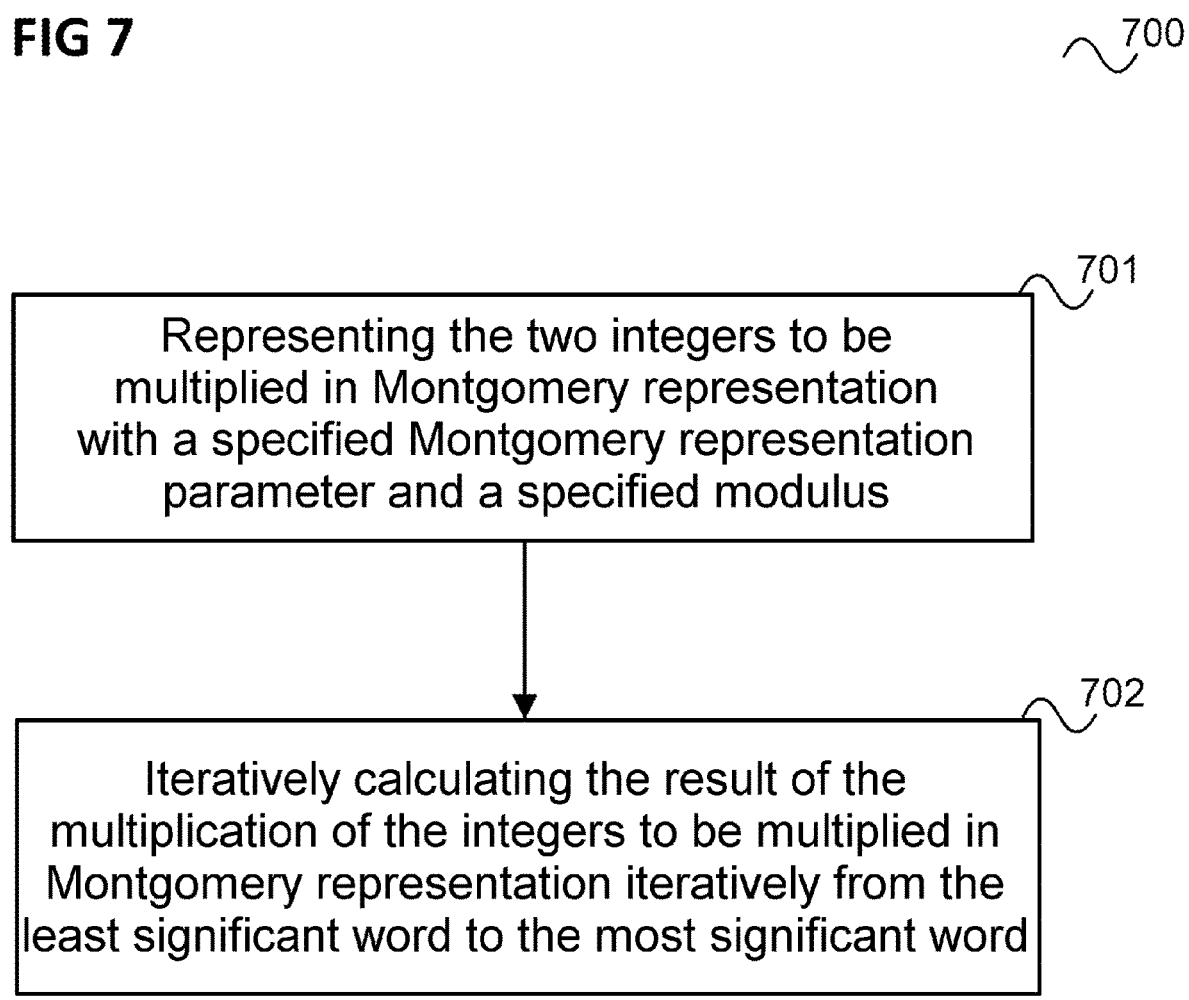
FIG. 7 shows a flowchart illustrating a method for the cryptographic processing of data based on modular multiplication according to a non-limiting embodiment.

FIG. 7 shows a flowchart 700 illustrating a method for the cryptographic processing of data based on modular multiplication according to a non-limiting embodiment.

In 701, two numbers to be multiplied are represented in Montgomery representation with a specified Montgomery representation parameter and a specified modulus.

In 702, the result of the multiplication of the integers to be multiplied in Montgomery representation is calculated iteratively from the least significant word to the most significant word, wherein for a word calculated in an iteration, the product of the word with a specified factor is added to the words of subsequent iterations, the specified factor being given by the product of the negative inverse of the least significant word of the modulus and the modulus, without the least significant word of the product, plus one.

In the following text, various non-limiting embodiments are specified.

Non-limiting embodiment 1 is an integrated circuit for the modular multiplication of two integers for a cryptographic method, as described with reference to FIG. 6.

Non-limiting embodiment 2 is an integrated circuit according to non-limiting embodiment 1, including a memory, wherein for a classification of the module into words according to a specified word width, the processor is configured to pre-calculate the product of the negative inverse of the least significant word of the modulus and the modulus, and to store at least part of said product in the memory in the form of a constant derived therefrom, and wherein the processor is configured to calculate the specified factor from the stored constant.

Non-limiting embodiment 3 is an integrated circuit according to either of non-limiting embodiments 1 to 2, the processor being configured to calculate scalar products in order to calculate the result of the modular multiplication of the integers to be multiplied in Montgomery representation.

Non-limiting embodiment 4 is an integrated circuit according to non-limiting embodiment 3, the processor being configured to calculate scalar products between the words of the integers to be multiplied and scalar products of the words of the multiplication result of the integers to be multiplied in Montgomery representation with words of the specified factor.

Non-limiting embodiment 5 is an integrated circuit according to non-limiting embodiment 3 or 4, the processor being configured to calculate the scalar products by means of pipelining.

Non-limiting embodiment 6 is an integrated circuit according to any one of non-limiting embodiments 3 to 5, the processor having at least one multiplier-accumulator unit and being configured to calculate the scalar products by means of the at least one multiplier-accumulator unit.

non-limiting embodiment 7 is an integrated circuit according to any one of non-limiting embodiments 1 to 6, wherein for each of a number of less significant words of the result of multiplying the integers to be multiplied in Montgomery representation equal to the number of words of the Montgomery representation parameter, the processor is configured to add the product of the word and a specified factor to the words of subsequent iterations.

Non-limiting embodiment 8 is an integrated circuit according to any one of non-limiting embodiments 1 to 7, wherein for each iteration up to the iteration corresponding to the number of words of the Montgomery representation parameter, the processor is configured to add the product of the word calculated in the iteration and the specified factor to the words of subsequent iterations.

Non-limiting embodiment 9 is an integrated circuit according to any one of non-limiting embodiments 1 to 8, wherein the number of words of the Montgomery representation parameter is equal to the number of words of the integers to be multiplied and the number of the modulus.

Non-limiting embodiment 10 is an integrated circuit according to any one of non-limiting embodiments 1 to 9, wherein the specified word width is the register width or bus width of the processor.

Non-limiting embodiment 11 is an integrated circuit according to any one of non-limiting embodiments 1 to 10, wherein the Montgomery representation parameter is a power of two and the modulus is odd.

Non-limiting embodiment 12 is an integrated circuit according to any one of non-limiting embodiments 1 to 11, the processor being further configured to calculate the product of the modular multiplication of the two integers from the result of the multiplication of the integers to be multiplied in Montgomery representation, by modular division by the Montgomery representation parameter.

Non-limiting embodiment 13 is an integrated circuit according to any one of non-limiting embodiments 1 to 12, wherein the cryptographic method is an asymmetric method for signing, decrypting or encrypting data, for signature verification or for key exchange.

Non-limiting embodiment 14 is an integrated circuit according to any one of non-limiting embodiments 1 to 13, including a memory containing cryptographic data to be processed and a cryptographic key, the processor being configured to form the integers to be multiplied from the cryptographic data and/or the cryptographic key.

Non-limiting embodiment 15 is a method for the cryptographic processing of data based on modular multiplication, as described by reference to FIG. 7.

Non-limiting embodiment 16 is a method according to non-limiting embodiment 15, wherein in order to perform a classification of the modulus into words corresponding to a specified word width, the product of the negative inverse of the least significant word of the modulus and the modulus is pre-calculated and at least part of said product is stored in a memory in the form of a constant derived therefrom, and wherein the specified factor is calculated from the stored constant.

Non-limiting embodiment 17 is a method according to either of the non-limiting embodiments 15 to 16, wherein scalar products are calculated in order to calculate the result of the modular multiplication of the integers to be multiplied in Montgomery representation.

Non-limiting embodiment 18 is a method according to non-limiting embodiment 17, wherein scalar products between the words of the integers to be multiplied are calculated and scalar products of the words of the multiplication result of the integers to be multiplied in Montgomery representation with words of the specified factor are calculated.

Non-limiting embodiment 19 is a method according to non-limiting embodiment 17 or 18, the scalar products being calculated by means of pipelining.

Non-limiting embodiment 20 is a method according to any one of non-limiting embodiments 17 to 19, the scalar products being calculated by means of at least one multiplier-accumulator unit.

Non-limiting embodiment 21 is a method according to any one of non-limiting embodiments 15 to 20, wherein for each of a number of less significant words of the result of multiplying the integers to be multiplied in Montgomery representation, equal to the number of words of the Montgomery representation parameter, the product of the word and a specified factor is added to the words of subsequent iterations.

Non-limiting embodiment 22 is a method according to any one of non-limiting embodiments 15 to 21, wherein for each iteration up to the iteration corresponding to the number of words of the Montgomery representation parameter, the product of the word calculated in the iteration and the specified factor is added to the words of subsequent iterations.

Non-limiting embodiment 23 is a method according to any one of non-limiting embodiments 15 to 22, wherein the number of words of the Montgomery representation parameter is equal to the number of words of the integers to be multiplied and the number of the modulus.

Non-limiting embodiment 24 is a method according to any one of non-limiting embodiments 15 to 23 carried out by a processor, wherein the specified word width is the register width or bus width of the processor.

Non-limiting embodiment 25 is a method according to any one of non-limiting embodiments 15 to 24, wherein the Montgomery representation parameter is a power of two and the modulus is odd.

Non-limiting embodiment 26 is a method according to any one of non-limiting embodiments 15 to 25, wherein from the result of the multiplication of the integers to be multiplied in Montgomery representation, the product of the modular multiplication of the two integers is calculated by modular division by the Montgomery representation parameter.

Non-limiting embodiment 27 is a method according to any one of non-limiting embodiments 15 to 26, wherein the cryptographic method is an asymmetric method for signing, decrypting or encrypting data, for signature verification or for key exchange.

Non-limiting embodiment 28 is a method according to any one of non-limiting embodiments 15 to 27, including storing of cryptographic data to be processed and a cryptographic key, and forming the integers to be multiplied from the cryptographic data and/or the cryptographic key.

Another non-limiting embodiment is an integrated circuit for the modular multiplication of two integers for a cryptographic method, having: conversion means for representing the integers to be multiplied in Montgomery representation with a specified Montgomery representation parameter and a specified modulus; and calculation means for calculating the result of the module multiplication of the integers to be modular multiplied in Montgomery representation iteratively from the least significant word to the most significant word, wherein for a word calculated in an iteration, the product of the word with a specified factor is added to the words of subsequent iterations, the specified factor being given by the product of the negative inverse of the least significant word of the modulus and the modulus, without the least significant word of the product, plus one.

Although this disclosure has mainly been shown and described by reference to specific non-limiting embodiments, it should be understood by those familiar with the technical field that numerous changes can be made with regard to its design and details without departing from the nature and scope of this disclosure, as defined by the claims. The scope of this disclosure shall, therefore, be defined by the claims, and it is intended that any changes that fall within the literal meaning or equivalent scope of the claims are included.

LIST OF REFERENCE SIGNS 100 processing device
101 CPU
102 RAM
103 non-volatile memory
104 cryptomodule
105 bus
106 analog module
107 input/output interface
108-111 cryptocores 112 hardware random number generator
200 operand-scanning diagram
300 multiplier-accumulator unit
301 multiplier
302 adder
303 accumulator
304 register
400 product-scanning diagram
500 pipelining diagram
600 integrated circuit
601 processor
700 flow diagram
701, 702 processing operations

What is claimed is:

1. An integrated circuit for computer-based modular multiplication of two integers for a cryptographic method, the integrated circuit comprising:
a pipelining processor configured to: two integers to be multiplied in Montgomery representation with a specified Montgomery representation parameter and a specified modulus, and
calculate a result of a modular multiplication of the two integers to be multiplied in Montgomery representation iteratively from a least significant word to a most significant word,
wherein, for a word calculated in an iteration, the pipelining processor is configured to add a first product comprising a product of the word and a specified factor is-added to words of subsequent iterations,
wherein the specified factor is given by a second product comprising a product of a negative inverse of a least significant word of the specified modulus and the specified modulus, without the least significant word of the second product, plus one,
wherein the pipelining processor is further configured to calculate scalar products in order to calculate the result of the modular multiplication of the two integers to be multiplied in Montgomery representation, wherein the pipelining processor is configured to calculate the scalar products by means of pipelining and
wherein the pipelining processor comprises at least one multiplier-accumulator unit configured to calculate the scalar products by means of the at least one multiplier-accumulator unit.

2. The integrated circuit as claimed in claim 1, further comprising:
a memory,
wherein, for a classification of the specified modulus into words according to a specified word width, the pipelining processor is further configured to:
pre-calculate the second product comprising the product of the negative inverse of the least significant word of the specified modulus and the specified modulus, and
store at least part of the second product in the memory in the form of a constant derived therefrom; and
wherein the pipelining processor is further configured to calculate the specified factor from the stored constant.

3. The integrated circuit as claimed in claim 1,
wherein the pipelining processor is further configured to:
calculate scalar products between words of the two integers to be multiplied, and
calculate scalar products of words of the result of the modular multiplication of the two integers to be multiplied in Montgomery representation and words of the specified facto r.

4. The integrated circuit as claimed in claim 1,
wherein, for each of a number of less significant words of the result of multiplying the two integers to be multiplied in Montgomery representation equal to a number of words of the specified Montgomery representation parameter, the pipelining processor is further configured to add the product of the word and a specified factor to the words of subsequent iterations.

5. The integrated circuit as claimed in claim 1,
wherein, for each iteration up to an iteration corresponding to a number of words of the specified Montgomery representation parameter, the pipelining processor is further configured to add the product of the word calculated in the iteration and the specified factor to the words of subsequent iterations.

6. The integrated circuit as claimed in claim 1,
wherein a number of words of the specified Montgomery representation parameter is equal to a number of words of the two integers to be multiplied in Montgomery representation and a number of the specified modulus.

7. The integrated circuit as claimed in claim 1,
wherein a specified word width is a register width or bus width of the pipelining processor.

8. The integrated circuit as claimed in claim 1,
wherein the specified Montgomery representation parameter is a power of two and the specified modulus is odd.

9. The integrated circuit as claimed in claim 1
wherein the pipelining processor is further configured to calculate a product of the modular multiplication of the two integers to be multiplied in Montgomery representation from the result of the modular multiplication of the two integers to be multiplied in Montgomery representation, by modular division by the specified Montgomery representation parameter.

10. The integrated circuit as claimed in claim 1,
wherein the cryptographic method is an asymmetric method for signing, decrypting or encrypting data, for signature verification or for key exchange.

11. The integrated circuit as claimed in claim 1, further comprising:
a memory containing cryptographic data to be processed and a cryptographic key, wherein the pipelining processor is further configured to form the two integers to be multiplied in Montgomery representation from the cryptographic data and/or the cryptographic key.

12. A method for cryptographic processing of data based on computer-based modular multiplication, the method comprising:
representing two integers to be multiplied in Montgomery representation with a specified Montgomery representation parameter and a specified modulus, and
calculating a result of a modular multiplication of the two integers to be multiplied in Montgomery representation iteratively from a least significant word to a most significant word,
wherein, for a word calculated in an iteration, adding a first product comprising a product of the word and a specified factor to words of subsequent iterations,
wherein the specified factor is given by a second product comprising a product of a negative inverse of a least significant word of the specified modulus and the specified modulus, without the least significant word of the second product, plus one
the method further comprising:
calculating scalar products in order to calculate the result of the modular multiplication of the two integers to be multiplied in Montgomery representation, wherein calculating the scalar products comprises calculating the scalar products by means of pipelining, and wherein a pipelining processor comprise at least one multiplier-accumulator unit, and wherein calculating the scalar products comprises calculating the scalar products by means of the at least one multiplier-accumulator unit.

13. The method as claimed in claim 12, further comprising:

for a classification of the specified modulus into words according to a specified word width:
pre-calculating the product of the negative inverse of the least significant word of the specified modulus and the specified modulus, and
storing at least part of the product of the negative inverse of the least significant word of the specified modulus and the specified modulus in a memory in the form of a constant derived therefrom; and
calculating the specified factor from the stored constant.

14. The method as claimed in claim 13, further comprising:

calculating scalar products between words of the two integers to be multiplied; and
calculating scalar products of words of the result of the modular multiplication of the two integers to be multiplied in Montgomery representation and words of the specified factor.

\* \* \* \* \*